T. HOOCK.
ELECTRICALLY HEATED APPARATUS.
APPLICATION FILED OCT. 23, 1912.
1,146,329.
Patented July 13, 1915.
2 SHEETS—SHEET 2.
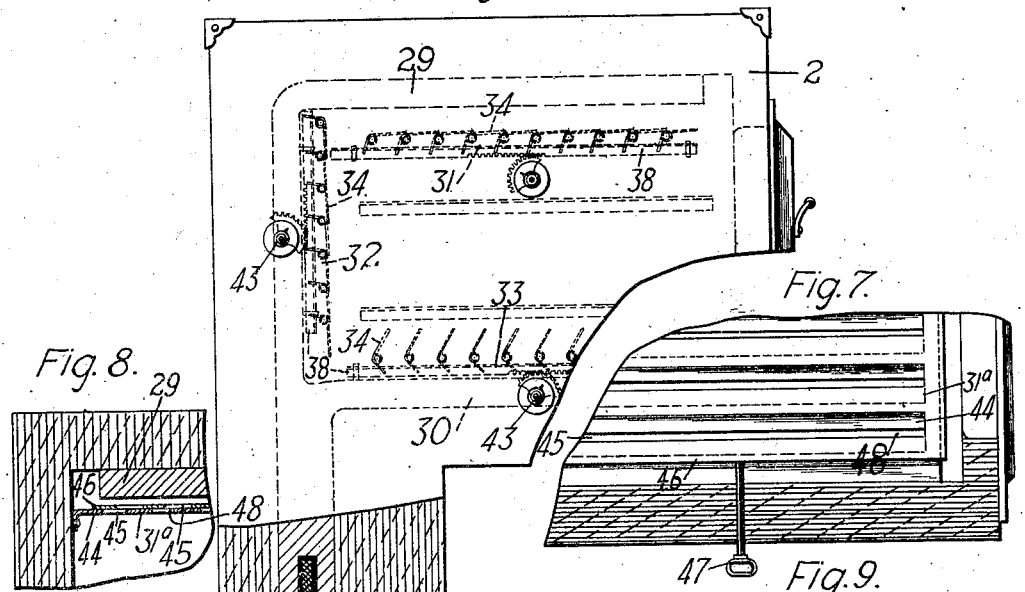
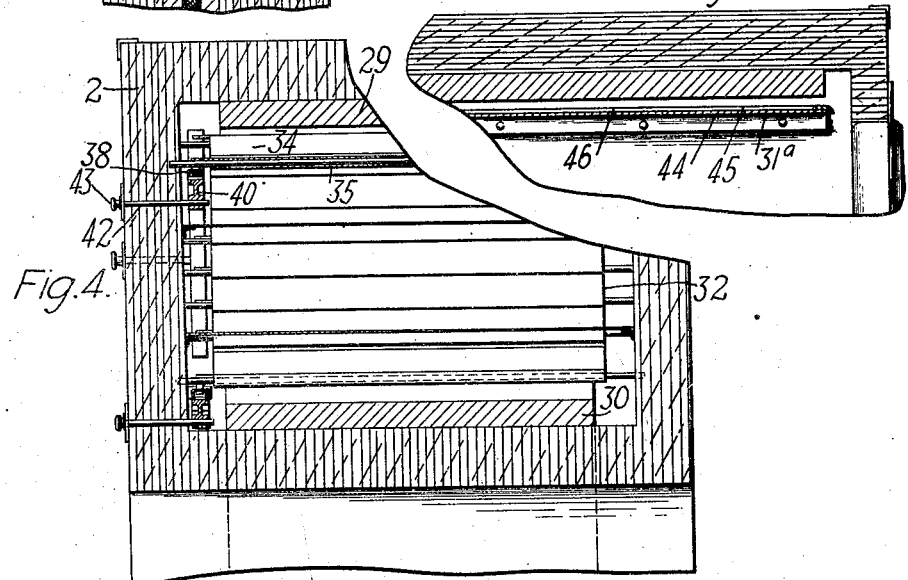
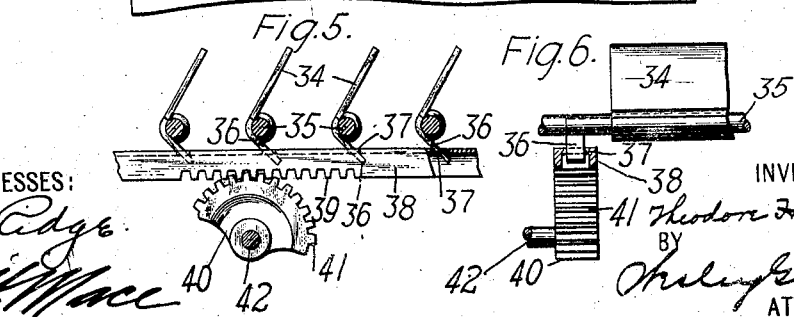
WITNESSES:
INVENTOR
Theodor Hoock
BY
ATTORNEY

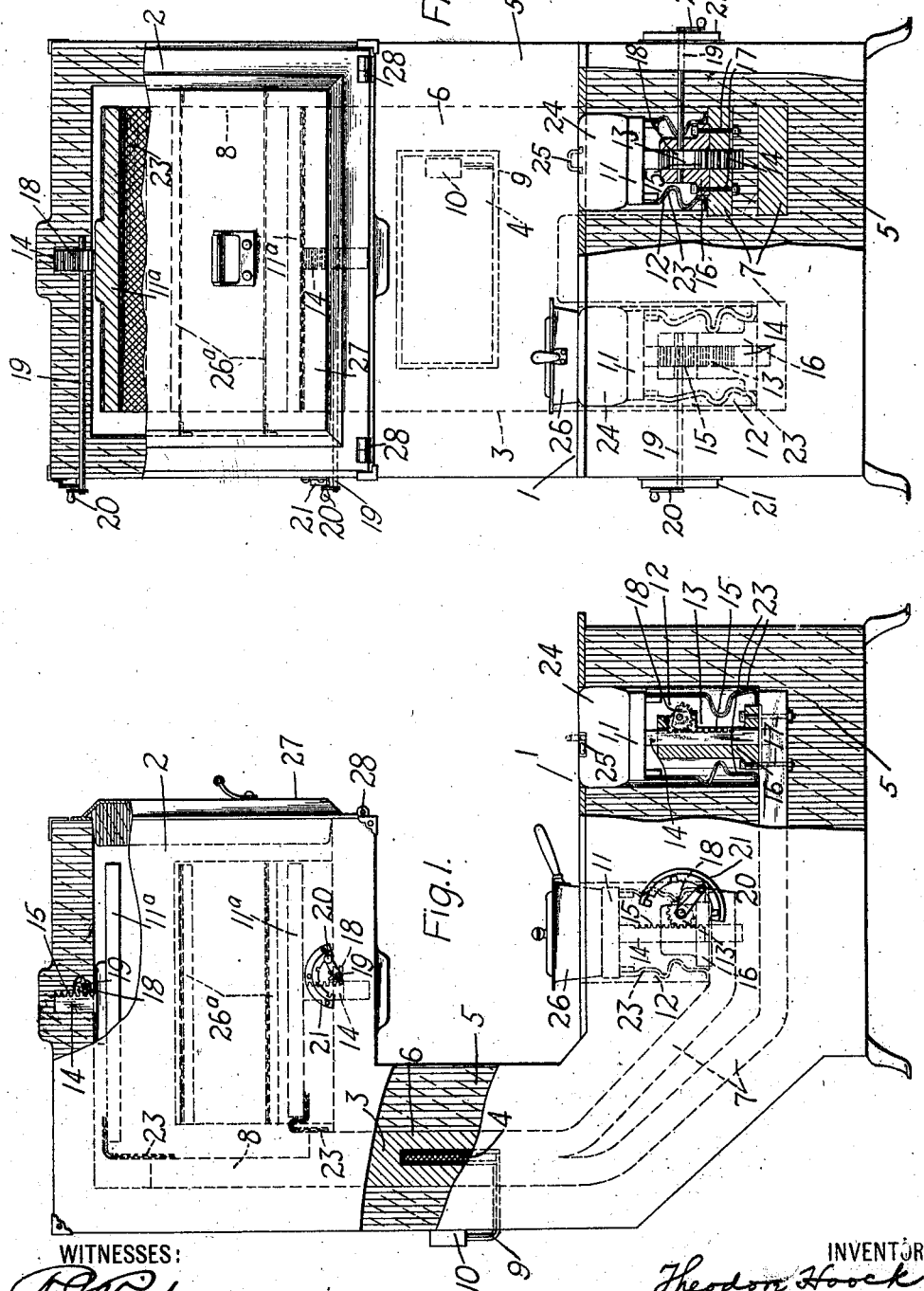

UNITED STATES PATENT OFFICE.

THEODORE HOOCK, OF COLOGNE, BAYENTHAL, GERMANY, ASSIGNOR TO WESTINGHOUSE ELECTRIC AND MANUFACTURING COMPANY, A CORPORATION OF PENNSYLVANIA.

ELECTRICALLY-HEATED APPARATUS.

1,146,329.  Specification of Letters Patent.  Patented July 13, 1915.

Application filed October 23, 1912. Serial No. 727,294.

*To all whom it may concern:*

Be it known that I, THEODORE HOOCK, a subject of the Emperor of Germany, and a resident of Cologne, Bayenthal, Germany, have invented a new and useful Improvement in Electrically-Heated Apparatus, of which the following is a specification.

My invention relates to electrically heated apparatus, and it has special reference to cooking ranges and ovens of the so-called "heat-storage" type which are provided with a mass or body of material adapted to store or accumulate heat that may be supplied thereto electrically at a low and constant rate, whereby the accumulated heat may be available for cooking purposes at any desired rate.

The object of my invention is to simplify and improve the construction and operation of devices of the above-indicated character, and to provide an inexpensive device of great utility which may be operated economically by reason of its high efficiency.

Another object of my invention is to provide a unitary structure embodying a range and an oven, having a single heat-storage body interposed between them that is constructed and arranged in such manner that any of the several "hot-plates" of the range and the oven may be utilized for various purposes without materially affecting the temperature or heat distribution of the remaining hot-plates.

A further object of my invention is to provide means whereby the hot-plates of the range may be adjusted in position as desired in order that the various cooking operations may be performed under the most economical and efficient conditions.

A still further object of my invention is to embody in the oven a plurality of hot-plates and to provide means for regulating the heat distribution therefrom within the oven.

A still further object of my invention is to provide adequate means for connecting the movable hot-plates with the heat-storage body to conduct the heat thereto without undue loss and to permit a considerable degree of movement of said hot-plates.

My invention may be best understood by reference to the accompanying drawings in which—

Figure 1 is a view, partially in section and partially in side elevation, of a cooking device embodying my invention. Fig. 2 is a view, partially in section and partially in front elevation, of the device shown in Fig. 1. Fig. 3 is a view, in side elevation, of a portion of a device embodying a modified form of my invention. Fig. 4 is a view, partially in section and partially in front elevation, of the device shown in Fig. 3. Figs. 5 and 6 are enlarged views, respectively in side elevation and in front elevation, of a portion of the mechanism shown in Figs. 3 and 4, and Figs. 7, 8 and 9 are sectional views, respectively in plan, end elevation and front elevation, of a portion of a device embodying a further modification of my invention.

Referring to Figs. 1 and 2 of the drawings, the cooking apparatus here shown comprises a range 1, an oven 2, a heat-storage body 3, an electric heater 4 and walls 5 of heat-insulating material that envelop said parts. The heat-storage body 3 comprises a main body portion 6 disposed between the range 1 and the oven 2 and having a plurality of integrally associated projecting arms 7 and 8 which are adapted to store heat and deliver the same to the range 1 and to the oven 2, respectively. The several arms 7 are entirely independent, the one from the other, except as they form integral parts of the main body portion 6, and are separated by and embedded in the heat-insulating material 5. The heat-storage body 3 and its projecting arms may conveniently be made of cast iron, but I do not wish to confine myself to any specific material, as various materials are well adapted to accumulate and store heat, and may, therefore, be employed for this purpose.

The heater unit 4 is inserted or embedded in the main body portion 6 of the heat-storage body 3 and may be of any well-known construction. The heater unit 4 is provided with a plurality of leads 9 which terminate in a terminal box 10 for the purpose of connection to an outside source of energy (not shown).

The respective ends of the projecting heat-storage arms 7 are severally provided with a hot-plate 11 of a similar material to that which constitutes the main heat-storage body 3, and said hot-plate 11 is located in a suitable recess 12 and is provided with mechanical means 13 for raising and lowering the same with respect to the upper surface of the range.

Preferably, each hot-plate 11 constitutes a disk which is provided with a downwardly projecting stem 14 having a plurality of teeth 15 thereon. The stem 14 projects into a suitable opening in a supporting member 16 which is securely fastened to the arm 7 by bolts 17 or other suitable means. The supporting member 16 is of material similar to that of the heat-storage body 3, and if desired may form an integral part of the arm 7. Associated with the supporting member 16 is a pivotally mounted pinion 18 that is adapted to coöperate with the teeth 15 in a well-known manner. The pinion 18 is fixed to a shaft 19 that projects to the exterior of the range 1 and is provided with a suitable handle 20 by means of which the hot-plate 11 may be raised and lowered through the agency of the rack-and-pinion connection hereinbefore set forth. A notched segment 21 is provided on the exterior of the range 1 for the purpose of defining various positions of the handle 20, whereby the hot-plate 11 may be definitely retained in any desired position. In order to conduct the heat efficiently from the arm 7 to the hot-plate 11, a plurality of flexible heat-conducting members 23 are provided whereby movement of the hot-plate 11 is permitted.

Removable pads 24 of heat insulating material are disposed within the upper portions of the several recesses 12 for the purpose of retaining the heat and preventing radiation losses when the hot-plates are not in use. Handles 25 are secured to the pads 24 for convenience in handling.

In operation, the pad 24 is removed and the hot-plate 11 raised to the desired height by means of the handle 20 and the rack-and-pinion mechanism hereinbefore described, after which a cooking utensil 26 may be disposed upon the hot-plate 11 as shown in the drawings. For most efficient operation, it is, of course, evident that the hot-plate 11 and the utensil 26 resting thereon should be located as far below the surface of the range as possible, so that excessive radiation losses are prevented and practically all of the heat of the hot-plate 11 is transmitted to the utensil 26.

Any one, or all, of the hot-plates 11 may be employed, and, by reason of the separate projecting arms 7 of the heat-storage body 3, the temperature and heat distribution of the various arms and hot-plates are not materially affected by the cooking operations which are being conducted on any other hot-plates, that is to say,—the cooking operation on one of the hot-plates does not tend to materially lower the temperature of any of the other plates since the projecting arm with which it is associated is substantially independent of the other arms. When the hot-plates are not in use, they should preferably occupy their extreme lowest positions and the removable pads 24 should be set into the upper portions of the recesses 12.

The projecting arm 8 of the heat-storage body 3 constitutes a part of the rear wall of the oven 2, while a plurality of hot-plates 11ª are disposed, respectively, at the top and bottom of said oven. Each of the hot-plates 11ª is provided with a stem 14 having a plurality of teeth 15 which are adapted to coöperate with a pinion 18, the latter member being secured to a shaft 19 having a handle 20 at its outer end. A notched segment 21 is also provided to define the positions of the handle 20 in the same manner as hereinbefore set forth with respect to the hot-plates 11 of the range 1. Flexible members 23 are employed for connecting the several oven hot-plates 11ª to the heat-storage body 3 or its arm 8.

Disposed within the oven 2 are a plurality of shelves 26ª for supporting the materials to be cooked, and said oven is furthermore provided with a door 27 which is preferably filled with heat-insulating material and is pivotally supported upon a plurality of hinges 28.

By reason of the mechanism, hereinbefore set forth, for adjusting the positions of the oven hot-plates 11ª, it is evident that the distribution of the heat within the oven may be regulated as desired; for instance, if it be desired to increase the amount of heat delivered to the upper surface of the materials to be cooked, it is only necessary to turn the handle 20 that is associated with the upper hot-plate 11ª, whereby said hot-plate may be lowered into proximity to the materials. Thus, by adjusting the positions of the upper and lower hot-plates 11ª, any desired distribution of heat within the oven and with respect to the materials to be cooked may be obtained. Obviously, the oven 2 may be provided with other hot-plates which may be located adjacent to the side and rear walls thereof, if desired. Furthermore, since the structural details of the mechanisms for actuating the hot-plates 11 and 11ª are not material to my invention, any other suitable means for accomplishing the same purpose may be employed.

Reference may now be had to Figs. 3, 4, 5 and 6 which illustrate the oven 2 as provided with a plurality of stationary hot-plates 29 and 30 which constitute integral parts of the heat-storage body 3, said hot-plate 29 being located at the top and rear of the oven 2, while hot-plate 30 is disposed at the bottom thereof. Located adjacent to the hot-plates 29 and 30 are a plurality of adjustable shutters 31, 32 and 33.

The shutters 31, 32 and 33 are of like construction and each comprises a plurality of vanes or blades 34 that are pivotally mounted upon pins 35 and have integral projecting members 36 disposed at substantially right angles thereto and which project into openings 37 in a longitudinally movable channel member 38. The channel member 38 is provided with a plurality of teeth 39 which are adapted to coöperate with a segment 40 having teeth 41. The toothed segment 40 is fixed to a shaft 42 which projects to the exterior of the oven and is provided with a handle or knob 43 for purposes of manipulation. The rack-and-pinion mechanism, just described, is located at one end of the vanes 34 and said vanes extend the full width of the oven, and therefore, when closed, as shown in the case of shutters 31 and 32 in Fig. 3, are adapted to obstruct the distribution of heat from the adjacent hot-plates. In order to regulate the heat delivered to any particular portion of the materials within the oven, it is only necessary to operate the adjacent shutter to a greater or less degree, through the agency of the handle 43, as will be readily understood.

Referring now to Figs. 7, 8 and 9, I have shown a modified form of adjustable shutter 31ª which may be located adjacent to one of the hot-plates and comprises a stationary member 44 having a plurality of longitudinal openings 45 therein, and a movable member 46 which is adapted to coöperate therewith and which is provided with corresponding longitudinally disposed openings 45. The movable member 46 is provided with a handle 47 by means of which said member may be moved relative to the stationary member 44. As shown in the drawings, the movable member 46 partially overlaps the openings 45 of the stationary member 44, leaving narrow slits or openings 48 through which the heat from hot-plate 29 can be delivered to the interior of the oven 2. Obviously, by adjusting the position of the movable member 46, the widths of the openings 48 may be increased or decreased as desired, whereby the distribution of heat from hot-plate 29 may be regulated.

Although I have set forth the principle of my invention, and have shown and described apparatus which I now consider to be the preferred embodiment thereof, those skilled in the art will readily understand that the benefits and advantages of my invention may be obtained, to a greater or less degree, by other apparatus embodying modifications in the structural details and arrangement and location of parts, and it is my intention to cover such modifications in the appended claims.

I claim as my invention:

1. In a heating device, the combination with a heat-storage body having a plurality of projecting arms in good thermal conductive relation thereto, of means for heating said body, and heat-insulating material enveloping the same.

2. In a heating device, the combination with a heat-storage body having a plurality of integrally associated projecting arms, and means for heating said body, of movable members severally associated with said arms, and walls of heat-insulating material enveloping said parts.

3. In a cooking device, the combination with a heat-storage body having a plurality of separate projecting arms, and an electric heater associated with said body, of a movable hot-plate associated with each of said arms, means for actuating said hot-plate, and heat-insulating material surrounding said parts.

4. In a cooking device, the combination with a range and an oven, of heat-storage body associated therewith and having a plurality of integral arms for supplying heat to said oven and said range, means for electrically heating said body, and heat-insulating material enveloping said body and said arms.

5. In an electrically heated cooking device, the combination with a range and an oven, of heat-storage body interposed between and associated with said range and said oven, heat-insulating walls enveloping said body, and an electric heater associated therewith for supplying heat thereto.

6. In an electrically heated cooking device, the combination with a range and an oven, a heat-storage body interposed between and associated with said range and said oven, heat insulating walls enveloping said body, and an electric heater for said body, of movable hot-plates for use in said range and said oven, and members of flexible heat-conducting material for connecting said hot-plates to said storage body.

7. In an electrically heated cooking device, the combination with a heat-storage body, and an electric heater therefor, of a plurality of movable hot-plates, flexible means of heat-conducting material connecting said hot-plates to said body, adjustable means for actuating said hot-plates, and walls of heat-insulating material surrounding said parts to prevent the radiation of heat.

8. An electrically heated cooking device comprising an oven, a heat-storage body associated therewith, an electric heater therefor, and heat-insulating material surrounding said parts, of a plurality of hot-plates disposed within said oven, and means for regulating the distribution of heat therefrom.

9. An electrically heated cooking device comprising an oven, a heat-storage body associated therewith, an electric heater for said body, heat-insulating material enveloping said parts, and means for regulating the distribution of heat from said body within said oven.

10. A cooking device comprising an oven, heat-storage bodies disposed therein, an electric heater for said bodies, walls of heat-insulating material surrounding said parts, and distributing means for regulating the heat delivered from said bodies.

11. A cooking device comprising an oven, heat-storage bodies disposed therein, an electric heater for said bodies, a heat-insulating envelop surrounding said parts, and mechanical means for adjusting the positions of said heat-storage bodies.

12. A cooking device comprising an oven, a main heat-storage body associated therewith, means for electrically heating said body, auxiliary hot-plates severally disposed at the top and bottom of said oven, flexible heat-conducting members connecting said hot-plates to said body, and mechanical means for adjusting the positions of said hot-plates.

13. A cooking device comprising an oven, heat-storage bodies disposed therein, means for heating said bodies, and means disposed adjacent to said bodies for regulating the distribution of said heat within said oven.

14. A cooking device comprising an oven, heat-storage bodies disposed therein, means for electrically heating said bodies, and adjustable shutters disposed adjacent to said bodies for regulating the distribution of heat within said oven.

15. A cooking device comprising an oven, a plurality of heat-storage bodies disposed therein, an electric heater for said bodies, and independently adjustable shutters or screens disposed in proximity to said bodies for effecting the distribution of heat therefrom.

16. A heating device comprising an oven, heat-storage bodies disposed therein, means for heating said bodies, walls of heat-insulating material surrounding said parts, and adjustable means for apportioning the amounts of heats severally delivered to various parts of said oven.

In testimony whereof, I have hereunto subscribed my name this 5th day of Aug. 1912.

THEODORE HOOCK.

Witnesses:
LOUIS VANDORN,
BESSIE F. DUNLAP.

Copies of this patent may be obtained for five cents each, by addressing the "Commissioner of Patents, Washington, D. C."